United States Patent [19]

Guimier et al.

[11] 3,808,459

[45] Apr. 30, 1974

[54] ELECTRONIC DISTRIBUTOR FOR THE SEQUENTIAL SUPPLYING ELECTRIC-CURRENT-RECEIVING LOADS

[75] Inventors: Jacques A. Guimier, Chelles-les-Coudreaux; Pierre F. Coutin, Paris, both of France

[73] Assignee: R. Alkan & Cie., Valention, France

[22] Filed: Dec. 4, 1972

[21] Appl. No.: 312,113

[52] U.S. Cl. .............307/224, 307/218, 307/252 W, 102/70.2, 317/80

[51] Int. Cl. ...... F23q 7/02, H03k 11/00, F42b 5/08

[58] Field of Search ......... 328/106, 224 B; 307/224, 307/252 W, 218, 221, 221 B; 340/829, 309.4; 102/20.2; 317/80

[56] References Cited

UNITED STATES PATENTS 3,069,569 12/1962 Singer et al. .......................... 328/30

3,482,114 12/1969 Marshall ......................... 307/224 B

OTHER PUBLICATIONS

Proceeding of the I.R.E. 10/53, pp. 1316 & 1317, copy in Lib.

*Primary Examiner*—Rudolph V. Rolinec
*Assistant Examiner*—B. P. Davis

[57] ABSTRACT

Each load C1, C2, C3 . . . to which the electronic distributor is associated is supplied by an individual thyristor the triping device of which, except in the case of the first thyristor, is controlled by an AND-circuit having two inputs of which one is connected to the cathode of the previous thyristor while the other is connected, in the case of the odd thyristors, to one of the outputs of a bistable trigger circuit B, and in the case of the even thyristors to the other output of this trigger circuit, which is itself controlled by a pulse generator GI.

7 Claims, 2 Drawing Figures

ELECTRONIC DISTRIBUTOR FOR THE SEQUENTIAL SUPPLYING ELECTRIC-CURRENT-RECEIVING LOADS

BACKGROUND OF THE INVENTION

This invention relates to an electronic distributor for the sequential supplying of electric-current-receiving loads.

The invention is applied to the sequential supplying of electric-current-receiving loads, which in general can be any electrically operated apparatuses, for example lamps, relays of all kinds, etc.

The invention is particularly applicable to the sequential firing of pyrotechnic devices, for example for the launching, at a rapid and stable rate, of rockets on board combat aircraft, but this application is indicated only to facilitate the statement of the advantages of the electronic distributor according to the invention, and it will be understood that it has no limitative character.

BRIEF DESCRIPTION OF THE PRIOR ART

The sequential firing of pyrotechnic devices is generally effected by electro-mechanical selectors, but these devices possess a certain number of drawbacks, especially as a result of their high weight and bulk, which are particularly undesirable on board aircraft. Moreover their cost is high, and this fault is especially serious in the case of devices which are destined to be jettisoned after use. Electro-mechanical devices further possess the drawback of permitting only a quite slow maximum rate of operation.

To mitigate these drawbacks, various electronic devices can be imagined which make use of more or less complex counting circuits, especially of high price.

SUMMARY OF THE INVENTION

The invention has the purpose of effecting the desired sequential distribution at a rapid and very stable rate of operation, without the use of counting circuits, by virtue of the utilization of semi-conductor switching circuits of simplified assembly, which result in a structure of low weight, slight bulk, reduced price and great reliability.

In accordance with the invention, each of the successive loads is supplied by an individual thyristor the tripping device of which, except in the case of the first thyristor, is controlled by an AND-circuit having two inputs, one of which is connected to the cathode of the previous thyristor while the other is connected to one of the outputs of a bistable trigger circuit for the odd thyristors and to the other output of this trigger circuit for the even thyristors, which trigger circuit is itself controlled by a pulse generator giving the sweep rate, the tripping device of the first thyristor being connectable to the trigger circuit output controlling the AND-circuits of the odd thyristors.

It will be underatood that when the distributor as defined above is supplied, all the thyristors being initially blocked, the trigger circuit operates at the rate established by the pulse generator, and commenees by starting the first thyristor since each of the following thyristors can be started only after the tripping of the previous one, as a result of the action of its control AND-circuit. After the tripping of the first thyristor, each passage of the trigger circuit from one to the other of its two stable states will have the effect of tripping the following thyristor the AND-circuit of which will be fed on its two inputs.

The invention will be explained in greater detail hereinafter by reference to an example of embodiment which is illustrated diagrammatically in the accompanying drawing, wherein:

DESCRIPTION OF THE PREFERRED EMBODIMENT

Figure 1:
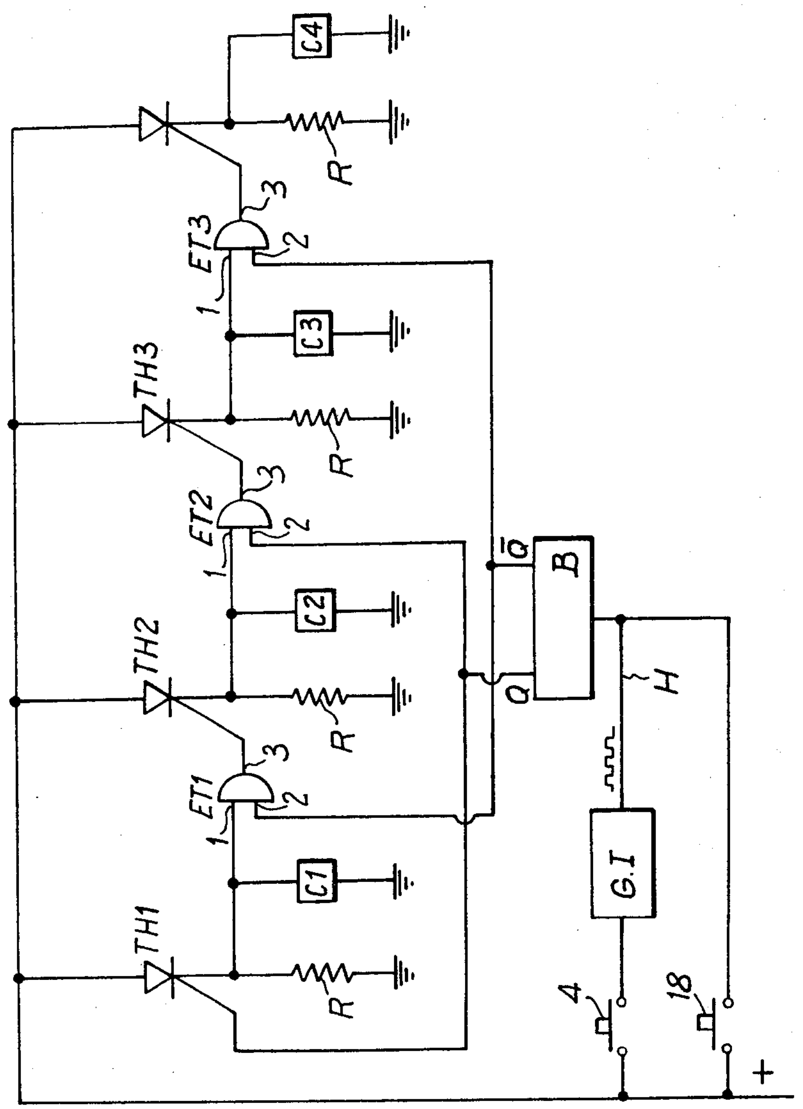
FIG. 1 is a simplified diagram showing the principle of an electronic distributor according to the invention.

In the drawing, for simplification in FIG. 1 there is represented the supplying of only four loads C1, C2, C3, C4 by the four thyristors TH1, TH2, TH3, TH4 respectively, but it is to be understood that the number of loads can be different, and especially can be much greater.

The cathodes of the thyristors TH1, TH2, TH3 are connected each to an input 1 or one of the AND-circuits indicated at ET1, ET2, ET3, the outputs 3 of which are respectively connected to the tripping devices of the thyristors TH2, TH3, TYH4. The tripping device of the first thyristor TH1 and the second input 2 of the circuit ET2 controlling the thyristor TH3 are connected to one of the outputs Q of the bistable trigger circuit B; this output Q would also supply the inputs 2 of the AND-circuits controlling the supplementary odd thyristor, in the case of a larger number of thyristors and loads. The other output of the trigger circuit B, indicated at $\bar{Q}$, is connected to the inputs 2 of the other AND-circuits, that is to say the circuits ET1 and ET3 controlling the thyristors TH2 and TH4, and in general to the inputs 2 of the AND-circuits controlling the even thyristors.

The trigger circuit B is controlled by the output H of a stable-frequency pulse generator G1 and the supplying of the anodes of the thyristors and of the pulse generator G1 is effected by a control switch 4. To avoid the interruption of the circuit through one of the loads C1, C2, C3 causing the placing out of circuit of the corresponding thyristor, and output resistor R of suitable value is provided in shunt on each of the loads C1, C2, C3.

The operation will be immediately understood from the foregoing description, and it will suffice to summarise it briefly below. On energisation of the device by closure of the control switch 4, all the thyristors are blocked and the loads C1, C2, C3, C4 are not supplied. When the trigger circuit B receives the first control pulse from the pulse generator G1, it assumes the state which causes, through its output Q, the tripping of the first thyristor TH1, which excites the load C1 and activates the input 1 of the coincidence circuit ET1, the second input 2 of which is activated as soon as the second pulse from the pulse generator G1 causes tripping of the trigger circuit B which then supplies its other output $\bar{Q}$ connected to the input 2 of the circuit ET1. This AND-circuit thus trips the thyristor TH2, exciting the load C2 and activating the input 1 of the coincidence circuit ET2, the input 2 of which is activated by a fresh tripping of the trigger circuit B under the action of the third pulse from the pulse generator G1, which effects supplying of the output Q. Thus this circuit ET2 trips the thyristor TH3 which supplies the load C3. The following tripping of the trigger circuit B will feed the output $\bar{Q}$ afresh, effecting supplying of the load C4 by the tripping of the thyristor TH4 under the action of the circuit ET3. The following loads, if any, will be supplied in sequence in the same manner. The number of paths is indeterminate.

It will be understood that the operation as set forth above does not permit an intermittent operation controlled by the actuation of the switch 4, or even a "one-at-a-time" operation controlled by the switch 18 (in parallel with the pulse generator G1) if desired.

The circuit elements are dimensioned according to the power to be controlled.

Figure 2:
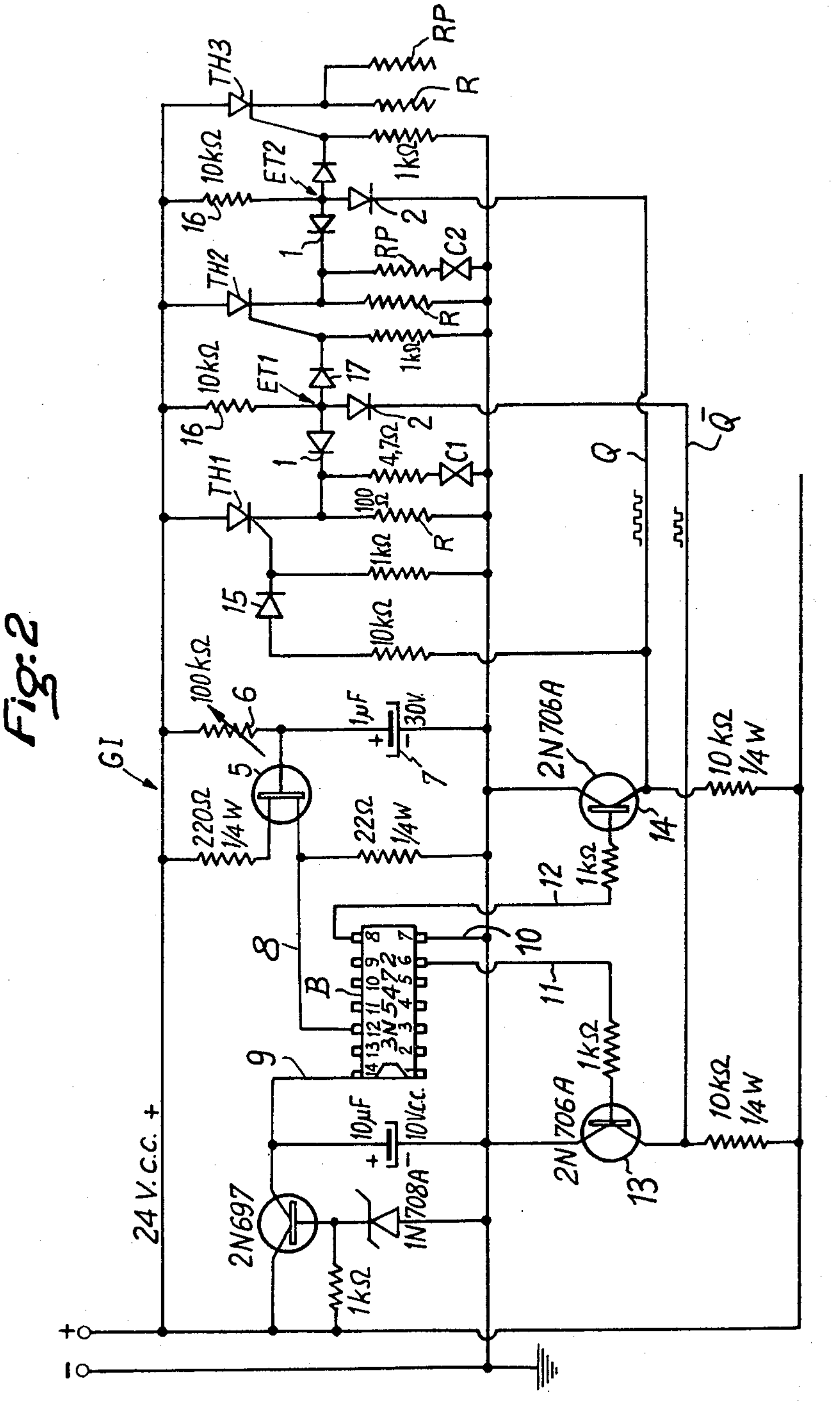
FIG. 2 is a more detailed part of an assembly usable for the distributor according to FIG. 1.

The pulse generator and the trigger circuit can be known assemblies. An example of embodiment of these assemblies and of the assemblage of the device is indicated in greater detail in FIG. 2, which is limited to the controlling of the first three thyristors, and in which the corresponding elements are indicated by the same references as in FIG. 1. In FIG. 2 there are also indicated the designations of transistors which can be used, and values of voltages, resistances, capacitances and powers.

In FIG. 2 the pulse generator G1 is a relaxation oscillator comprising a single-junction transistor 5, the emitter of which is connected to the anodes of the thyristors through a high regulable resistance 6, while a capacitor 7 is connected between this emitter and the negative supply line. It is understood that the discharge of the capacitor 7, resulting from starting of the transistor 5, interrupts the output thereof which thus generates pulses at a rate determined by the regulable resistance 6. The base 8 of the transistor 5 controls the trigger circuit B which is fed by the circuit 9–10, and the two outputs 11–12 of the trigger circuit B are respectively connected to the bases of two amplifier transistors 13, 14 which, when they are blocked by the output of the trigger circuit, maintain the two synchronisation circuits Q and $\bar{Q}$ at the positive tension of the feed line.

The circuit Q is connected through a diode 15 to the tripping device of the first thyristor TH1 and to one of the two inputs 1, 2 of the coincidence circuit ET2 controlling the thyristor TH3 (and to the AND-circuits controlling all the other odd thyristors). Likewise the circuit $\bar{Q}$ is connected to an input 2 of the circuit ET1 controlling the thyristor TH2 and to an input of the AND-circuits controlling the other even thyristors (not shown in FIG. 2). In the example as represented, each AND-circuit is a diode circuit supplied by the positive feed line through a high resistance 16 and supplying the tripping tension to the tripping device of the controlled thyristor through the diode 17 as soon as the two inputs 1, 2, constituted by two diodes, are activated by the conductance of the previous thyristor and of the corresponding transistor 13 or 14.

The manner of operation is as described with reference to FIG. 1. However a protective resistor RP is provided in series with each of the loads to limit the output of the corresponding supply thyristor in case the load should be short-circuited.

What is claimed is:

1. An electronic distributor for the sequential supplying of electric-current-receiving loads, particularly of pyrotechnic devices on board aircrafts comprising a source of electric current a plurality of successive thyristors, said thyristors having their anode circuits connected together to a source of electric current, a load connected to the cathode circuit of each thyristor. AND-circuits having inputs and being associated each with one of said plurality of successive thyristors except the first one, a first input of each AND-circuit connected to the cathode circuit of the previous thyristor of said plurality, an output of said AND-circuit connected to the tripping device of the associated thyristor, a pulse generator, a bistable trigger circuit having an input connected to said pulse generator, a first output of said bistable trigger circuit connected to the second input of each AND-circuit associated with an odd thyristor of said plurality and to the tripping device of the first thyristor of said plurality, and a second output of said bistable trigger circuit connected to the second input of each AND-circuit associated with an even thyristor of said plurality.

2. An electronic distributor according to claim 1, wherein the tripping device of the first thyristor is connected to the trigger circuit output controlling the AND-circuits of the odd thyristors.

3. An electronic distributor according to claim 1, wherein each output of said trigger circuit comprises an amplifier transistor.

4. An electronic distributor according to claim 1, including an output resistor in parallel with each of the loads capable of ensuring the conductance of the supply thyristor despite possible interruption of its circuit through the load.

5. An electronic distributor according to claim 1, including a protection resistor in series with each of the loads capable of limiting the power if the load should be short-circuited.

6. An electronic distributor according to claim 1 wherein said pulse generator comprises a single-junction transistor the emitter of which is connected, through a high regulable resistance, to the anodes of said thyristor, and a capacitor is connected between said emitter and the negative feed line of the electronic distributor.

7. An electronic distributor according to claim 1 wherein each AND-circuit is a diode circuit supplied by the positive feed line and connected through a diode to the tripping device of the controlled thyristor.

* * * * *